United States Patent
Daire et al.

(10) Patent No.: US 11,053,331 B2
(45) Date of Patent: Jul. 6, 2021

(54) POLYMERISATION PROCESS

(71) Applicant: INEOS EUROPE AG, Vaud (CH)

(72) Inventors: Erick Dominique Daire, Martigues (FR); Jean-Marc Galewski, Noeux-les-Mines (FR); Anthony Simoens, Vedrin (BE); Arnaud Soulage, Martigues (FR); Christine Skorupka, Marseilles (FR)

(73) Assignee: INEOS EUROPE AG, Vaud (CH)

( * ) Notice: Subject to any disclaimer, the term of this patent is extended or adjusted under 35 U.S.C. 154(b) by 284 days.

(21) Appl. No.: 16/315,316

(22) PCT Filed: Jun. 23, 2017

(86) PCT No.: PCT/EP2017/065492
§ 371 (c)(1),
(2) Date: Jan. 4, 2019

(87) PCT Pub. No.: WO2018/007165
PCT Pub. Date: Jan. 11, 2018

(65) Prior Publication Data
US 2019/0309103 A1    Oct. 10, 2019

(30) Foreign Application Priority Data
Jul. 6, 2016    (EP) .................................. 16178240

(51) Int. Cl.
*C08F 10/10* (2006.01)
*B01J 19/24* (2006.01)
(Continued)

(52) U.S. Cl.
CPC .......... *C08F 10/10* (2013.01); *B01J 19/0013* (2013.01); *B01J 19/242* (2013.01); *B01J 19/248* (2013.01); *B01J 19/249* (2013.01); *B01J 19/2425* (2013.01); *C08F 2/001* (2013.01); *C08F 4/005* (2013.01); *C08F 110/10* (2013.01); *B01J 2219/00081* (2013.01);
(Continued)

(58) Field of Classification Search
USPC ........................... 526/65; 422/132, 138, 200
See application file for complete search history.

(56) References Cited

U.S. PATENT DOCUMENTS 5,962,604 A     10/1999  Rath
6,168,765 B1 *  1/2001   Romatier ............... B01J 19/249
                                                           422/200
(Continued)

FOREIGN PATENT DOCUMENTS

CN       10364193       3/2014
CN       104024280      9/2014
(Continued)

OTHER PUBLICATIONS

International Search Report and Written Opinion of the ISA for PCT/EP2017/065492 dated Aug. 31, 2017, 13 pages.
(Continued)

*Primary Examiner* — Fred M Teskin
(74) *Attorney, Agent, or Firm* — Nixon & Vanderhye P.C.

(57) ABSTRACT

The present invention relates to a cascade process useful for (fast) ionic polymerisation of liquid monomer(s) containing reaction mixture for the production of the corresponding polymer(s).

23 Claims, 6 Drawing Sheets

(51) Int. Cl.
*C08F 2/01* (2006.01)
*C08F 4/00* (2006.01)
*C08F 110/10* (2006.01)
*B01J 19/00* (2006.01)
*C08F 2/00* (2006.01)

(52) U.S. Cl.
CPC ............................ *B01J 2219/2453* (2013.01); *B01J 2219/2458* (2013.01); *B01J 2219/2462* (2013.01)

(56) References Cited

U.S. PATENT DOCUMENTS

| | | | |
|---|---|---|---|
| 6,525,149 B1 | 2/2003 | Baxter, Jr. et al. | |
| 6,884,858 B2 * | 4/2005 | Baxter, Jr. | ............ C08F 10/00 526/133 |
| 2002/0048541 A1 | 4/2002 | Schodel et al. | |
| 2014/0235801 A1 | 8/2014 | Shaikh et al. | |
| 2015/0197584 A1 | 7/2015 | Shaikh et al. | |

FOREIGN PATENT DOCUMENTS

| | | |
|---|---|---|
| DE | 195 20 078 | 12/1996 |
| EP | 2 348 057 | 7/2011 |
| WO | 2009/009129 | 1/2009 |
| WO | 2013/062758 | 5/2013 |

OTHER PUBLICATIONS

Villermaux et al., "Use of Parallel Competing Reactions to Characterize Micromixing Efficiency" *AIChE Symposium Series*, vol. 88, No. 286: 6-10 (1991).

* cited by examiner

//
US 11,053,331 B2

POLYMERISATION PROCESS

This application is the U.S. national phase of International Application No. PCT/EP2017/065492 filed Jun. 23, 2017 which designated the U.S. and claims priority to EP Patent Application No. 16178240.4 filed Jul. 6, 2016, the entire contents of each of which are hereby incorporated by reference.

INTRODUCTION

The present invention relates to a process useful for (fast) ionic polymerisation of liquid monomer(s) containing reaction mixture for the production of the corresponding polymer(s). More particularly, the present invention relates to a cascade process useful for cationic polymerisation of liquid isobutylene containing reaction mixture for the production of the corresponding polyisobutylene.

PRIOR ART

The ionic polymerisation of liquid monomer(s) and more particularly the cationic polymerisation of olefins using Friedel-Crafts type catalysts is well known. Polyisobutylene ("PIB"), more particularly low molecular weight polyisobutylene is a very important industrial polymer which is produced by said cationic polymerisation process. In the last decades, most of the research efforts have been concentrated on the production of highly reactive PIB ("HR PIB") and on the development of catalyst systems for producing the PIB.

The degree of polymerisation of the polymer obtained can vary depending on the chosen polymerisation technology and on the selection of the parameters controlling the polymerisation reaction; a variety of polymers having different average molecular weights can be produced by controlling the said degree of polymerization.

U.S. Pat. No. 6,525,149 discloses a liquid phase polymerization process for preparing a polyolefin product having preselected properties wherein the feedstock and the catalyst composition are introduced into a residual reaction mixture recirculating in a loop reactor reaction zone provided in the tube side of a shell and tube heat exchanger at a recirculation rate sufficient to cause intimate intermixing of the residual reaction mixture, the added feedstock and the added catalyst composition. The heat of the polymerization reaction is removed from the recirculating intimately intermixed reaction admixture at a rate calculated to provide a substantially constant reaction temperature therein while the same is recirculating in said reaction zone. The conditions in the reactor are said to be appropriate for causing olefinic components introduced in said feedstock to undergo polymerization to form the desired polyolefin product in the presence of the catalyst composition; the product stream containing the desired polyolefin product is withdrawn from the reaction zone; the introduction of the feedstock into the reaction zone and the withdrawal of the product stream from the reaction zone are controlled such that the residence time of the olefinic components undergoing polymerization in the reaction zone is appropriate for production of the desired polyolefin product.

WO2013062758 (from the same Applicant as U.S. Pat. No. 6,525,149) also discloses a method of making a polyisobutylene polymer in a recirculating loop reactor with one or more reaction tubes in contact with a heat transfer medium; in particular, said method includes controlling the delta P and polymerization reaction to provide a linear velocity of the reaction mixture of at least 11 ft/sec in the one or more tubes of the loop reactor and/or controlling the delta P and polymerization reaction to provide specific recirculation ratios. The tube and shell reactor used in the examples comprises no less than 1 164 tubes with tube outer diameter of 0.375".

The morphology of this type of tube and shell reactors generates inherent drawbacks and/or restrictions in term of operating possibilities and performances. For example, the multitude of tubes not only requires stringent manufacturing conditions, but also impacts negatively the corresponding technology because e.g.

it does not allow for separate introductions of reactants,
tube replacement due to fouling and/or blockage is problematic,
an undivided coolant flow across the whole cross-sectional section and volume of the reactor favours preferential passages of the said coolant and correspondingly creates cooling inhomogeneity (e.g. dead zones), which in turn decreases the overall efficiency of the process,
for a given reactor volume, the ratio of surface area to reaction mixture volume is limited, etc. . . .

It is thus still desirable to develop a polymerisation unit/process which allows to provide an energy efficient process which produces a polymer having a narrow molecular weight distribution. This is one of the objectives of the present invention together with the following objectives/advantages as shown in the present invention, i.e.

An improved control of the initiation and/or initial propagation stages of the polymerisation reaction, and/or
An improved mixing of the reaction mixture and catalyst system components at the earliest stages of the reaction to achieve a homogeneous reaction, and/or
An improved exchange surface between the reaction mixture and the coolant, and/or
An improved heat transfer area to volume ratio, and/or
An improved (reduced) reaction mixture piping dimension (e.g. its length) between the inlet and the outlet of the polymerisation reactor (zones which would otherwise tend to developing adiabatic reaction), and/or
An improved reaction mixture flow paths in the reactor and/or in the reaction mixture piping system which reduces or even eliminates the priori art detrimental preferential passages and/or the dead zones, and/or
An improved (reduced) dimension of the reactor compared to e.g. the tubular reactor of the prior art, and/or
A low pressure drop pattern enabling on the reaction mixture process side, and/or
The possibility to introduce the reactants (including the catalyst) at different locations in the reactor, and/or
A divided and controlled coolant flow which eliminates the risks associated with preferential passages experienced in the prior art.

Additional advantages brought by the present invention will be detailed in the current description.

Invention

FIGURES

Figures—Summary

FIG. 3 is an illustrative embodiment of a polymerisation cascade process according to the present invention.

FIG. 1 is an illustrative embodiment of a second polymerisation unit according to the present invention.

FIGS. 1a, 1b and 1c are illustrative embodiments of polymerisation units according to the present invention.

FIG. 2 is an illustrative embodiment of a heat exchanger reactor system ("HERS") according to the second polymerisation unit of the present invention.

Process—Residence Times

Figure 1:
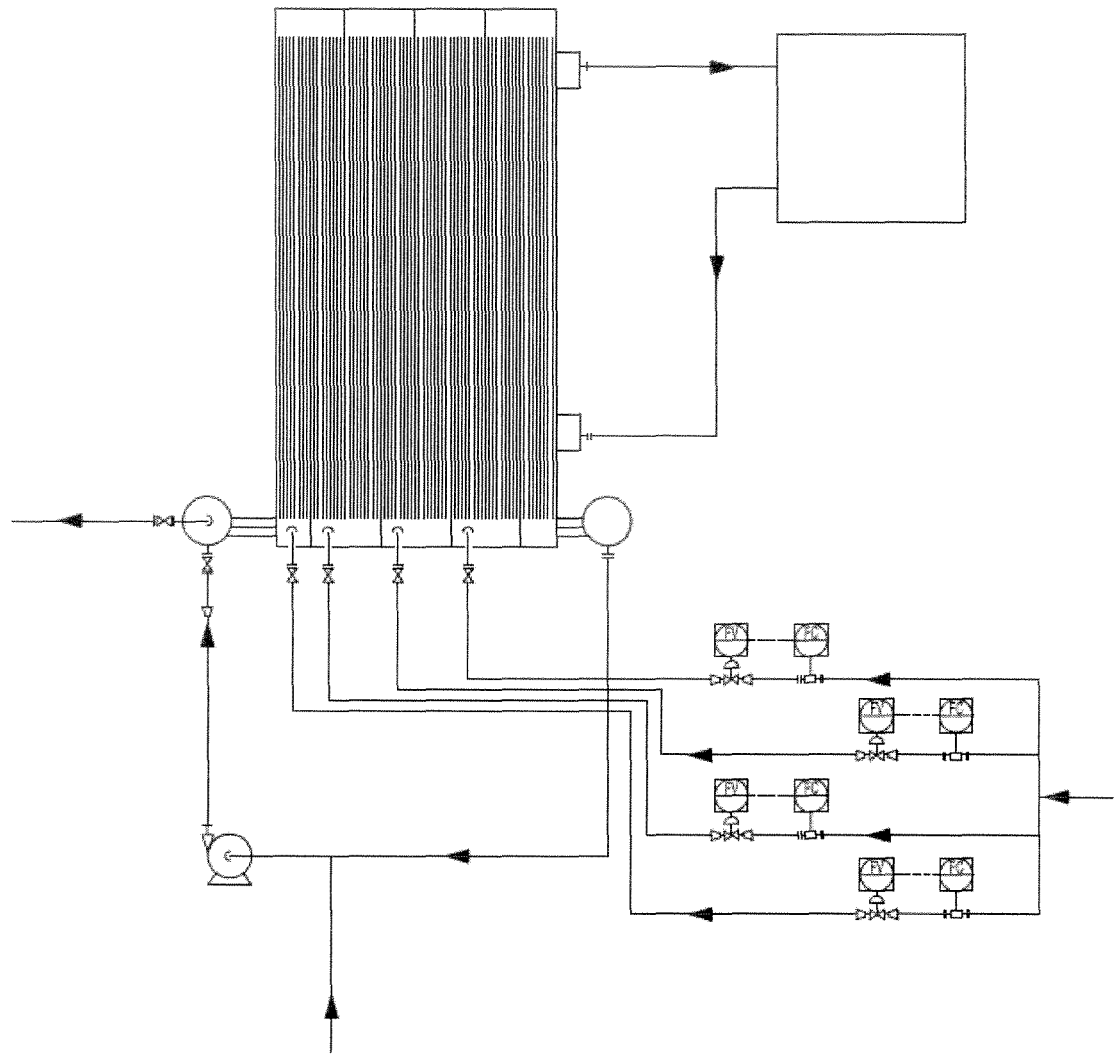
FIGS. 1, 1a, 1b, 1c, 2 and 3 are illustrative embodiments of polymerisation unit schemes according to the present invention.

In an embodiment according to the present invention, the ionic polymerisation is a cascade process for the polymerisation of a liquid monomer(s) containing reaction mixture (for example of isobutylene) in a polymerisation system comprising a first homogenising prepolymerisation unit ("HPPU") and a second polymerisation unit in series wherein the polymerisation reaction starts in the HPPU (first stage process) and continues in the second polymerisation unit (second stage process) consisting of a polymerisation loop, a coolant loop and a heat exchanger reactor system ("HERS") which is shared amongst the polymerisation loop and the coolant loop, characterised in that
 the ratio between the residence time of the reaction mixture in the first homogenising prepolymerisation unit and the residence time of the reaction mixture in the second polymerisation unit is comprised between 0.01% and 5%, preferably between 0.1% and 2%, for example between 0.1% and 1%.

In an embodiment according to the present invention, the ratio between the reactor volume of the reaction mixture in the first homogenising prepolymerisation unit and the reactor volume of the reaction mixture in the second polymerisation unit is comprised between 0.01% and 5%, preferably between 0.1% and 2%, for example between 0.1% and 1%.

The second polymerisation unit can be chosen amongst all of the polymerisation units consisting of a polymerisation loop, a coolant loop and a heat exchanger reactor system ("HERS") which is shared amongst the polymerisation loop and the coolant loop.

According to an embodiment of the present invention, said second polymerisation unit is characterised in that the temperature difference of the coolant between any point within the coolant side of the HERS is lower than 3° C.

Unit—HERS

In an illustrative embodiment according to the present invention, the second polymerisation unit for ionic polymerisation of a liquid monomer(s) containing reaction mixture, for example of isobutylene, comprising a polymerisation loop and a coolant loop and a heat exchanger reactor system ("HERS") which is shared amongst the polymerisation loop and the coolant loop, is characterised in that
 the polymerisation loop comprises a reaction mixture piping system connected to an inlet and an outlet of said HERS,
 the coolant loop comprises a coolant piping system connected to an inlet and an outlet of said HERS,
 the reaction mixture piping system comprises a circulating pump and the polymerisation loop comprises a polymer withdrawal system, characterised in that
 1. the HERS comprises at least one section,
 2. the said HERS' section(s) comprises "n" (n being an integer superior or equal to 1) parallelepipedic channel(s) for the reaction mixture and "n+1" passages for the coolant,
 3. the flow paths of the reaction mixture in the "n" channel(s) of a section are unidirectionally parallel,
 4. the flow paths of the coolant in the "n+1" passages of a section are unidirectionally parallel to the reaction mixture flow paths, and
 5. the coolant is not in direct contact with the reaction mixture.

Unit—Delta T

In an illustrative embodiment according to the present invention, the second polymerisation unit for ionic polymerisation of a liquid monomer(s) containing reaction mixture, for example of isobutylene, comprising a polymerisation loop and a coolant loop and a heat exchanger reactor system ("HERS") which is shared amongst the polymerisation loop and the coolant loop, is characterised in that
 the polymerisation loop comprises a reaction mixture piping system connected to an inlet and an outlet of said HERS,
 the coolant loop comprises a coolant piping system connected to an inlet and an outlet of said HERS,
 the reaction mixture piping system comprises a circulating pump and the polymerisation loop comprises a polymer withdrawal system, characterised in that
 1. the HERS comprises at least one section,
 2. the said HERS' section(s) comprises "n" (n being an integer superior or equal to 1) parallelepipedic channel(s) for the reaction mixture and "n+1" passages for the coolant,
 3. flow paths of the reaction mixture in the "n" channels) of a section are unidirectionally parallel,
 4. the flow paths of the coolant in the "n+1" passages of a section are unidirectionally parallel to the reaction mixture flow paths,
 5. the coolant is not in direct contact with the reaction mixture, and
 6. wherein the temperature difference of the coolant between any point within the coolant side of the HERS is lower than 3° C.

The reaction mixture according to the present invention comprises e.g. the monomer(s) and the catalyst system as further defined in the following description.

The temperature within the coolant side of the HERS can be controlled e.g. by the size of the "n+1" passages for the coolant and/or the flow rate of the coolant and/or the type of coolant.

In said embodiment, the temperature difference of the coolant between any point within the coolant side of the HERS is thus preferably lower than 3° C., preferably lower than 2.5° C., lower than 2° C., lower than 1.5° C., for example lower than 1° C.

Coolant

According to a preferred embodiment of the present invention, the coolant used for cooling the second polymerisation unit is an evaporative coolant, i.e. a coolant that evaporates at least partially in the HERS; in said configuration, the coolant piping system comprises a coolant liquefaction system. There is no restriction regarding the selection of the coolant according to this preferred embodiment of the present invention as long as it evaporates at least partially in the coolant channels of the HERS. Illustrative examples of preferred coolant which can be used according to the present invention are CFC (Chlorofluorocarbon), CFO (Chlorofluoroolefin), HCFC (Hydrochlorofluorocarbon), HCFO (Hydrochlorofluoroolefin), HFC (Hydrofluorocarbon), HFO (Hydrofluoroolefin), HCC (Hydrochlorocarbon), HCO (Hydrochloroolefin), HC (Hydrocarbon, e.g. propane and/or butane), HO (Hydroolefin, e.g. alkene(s), e.g. propylene and/or butylene), PFC (Perfluorocarbon), PFO (Perfluoroolefin), PCC (Perchlorocarbon), PCO (Perchloroolefin), Halon/Haloalkane, Ammonia and/or mixtures thereof. Propylene has been advantageously be used in the process of the present invention.

According to an embodiment of the present invention, the second polymerisation unit is characterised in that the coolant—which is not in direct contact with the reaction mixture—is an evaporative coolant.

Unit—Evaporative Coolant

In an illustrative embodiment according to the present invention, the second polymerisation unit for ionic polymerisation of a liquid monomer(s) containing reaction mixture, for example of isobutylene, comprising a polymerisation loop and a coolant loop and a heat exchanger reactor system ("HERS") which is shared amongst the polymerisation loop and the coolant loop, is characterised in that the polymerisation loop comprises a reaction mixture piping system connected to an inlet and an outlet of said HERS, the coolant loop comprises a coolant piping system connected an inlet and an outlet of said HERS, the polymerisation loop comprises a circulating pump and a polymer withdrawal system, characterised in that 1. the coolant is an evaporative coolant,
2. the coolant piping system comprises a coolant liquefaction system,
3. the HERS comprises at least one section,
4. the said HERS' section(s) comprises "n" (n being an integer superior or equal to 1) parallelepipedic channel(s) for the reaction mixture and "n+1" passages for the coolant,
5. the flow paths of the reaction mixture in the "n" channel(s) of a section are unidirectionally parallel,
6. the flow paths of the evaporative coolant in the "n+1" passages of a section are unidirectionally parallel to the reaction mixture flow paths, and
7. wherein the evaporative coolant is not in direct contact with the reaction mixture.

In said embodiment, the temperature difference of the evaporative coolant between any point within the coolant side of the HERS is preferably lower than 3° C., preferably lower than 2.5° C., lower than 2° C., lower than 1.5° C., for example lower than 1° C.

According to an embodiment of the present invention, the HERS comprises a shell which surrounds the reaction mixture parallelepipedic channel(s) and in which the coolant, preferably the evaporative coolant, circulated. The HERS is advantageously a plate and shell type reactor.

According to an embodiment of the present invention, the polymerisation loop comprises two or more HERS in series, for example two HERS in series. In said configuration, the reaction mixture outlet of the first HERS is connected via the reaction mixture piping system to the reaction mixture inlet of the second HERS, and the reaction mixture outlet of the second HERS is connected via the reaction mixture piping system to the reaction mixture inlet of the first HERS.

HERS—Material

According to an embodiment of the present invention, the material used for the plates of the reaction mixture channels is selected amongst Monel alloys (e.g. M400), carbon steel grades, alloy steel grades and/or stainless steel grades; carbon steel and/or alloy steel grades are preferred, in particular when their chromium content is lower than 10 wt %, lower than 5 wt %, lower than 1 wt %, for example 0 wt %. The said same material is also preferably used for all the plates of the HERS, preferably for the whole HERS.

HERS—Channels

Figure 2:
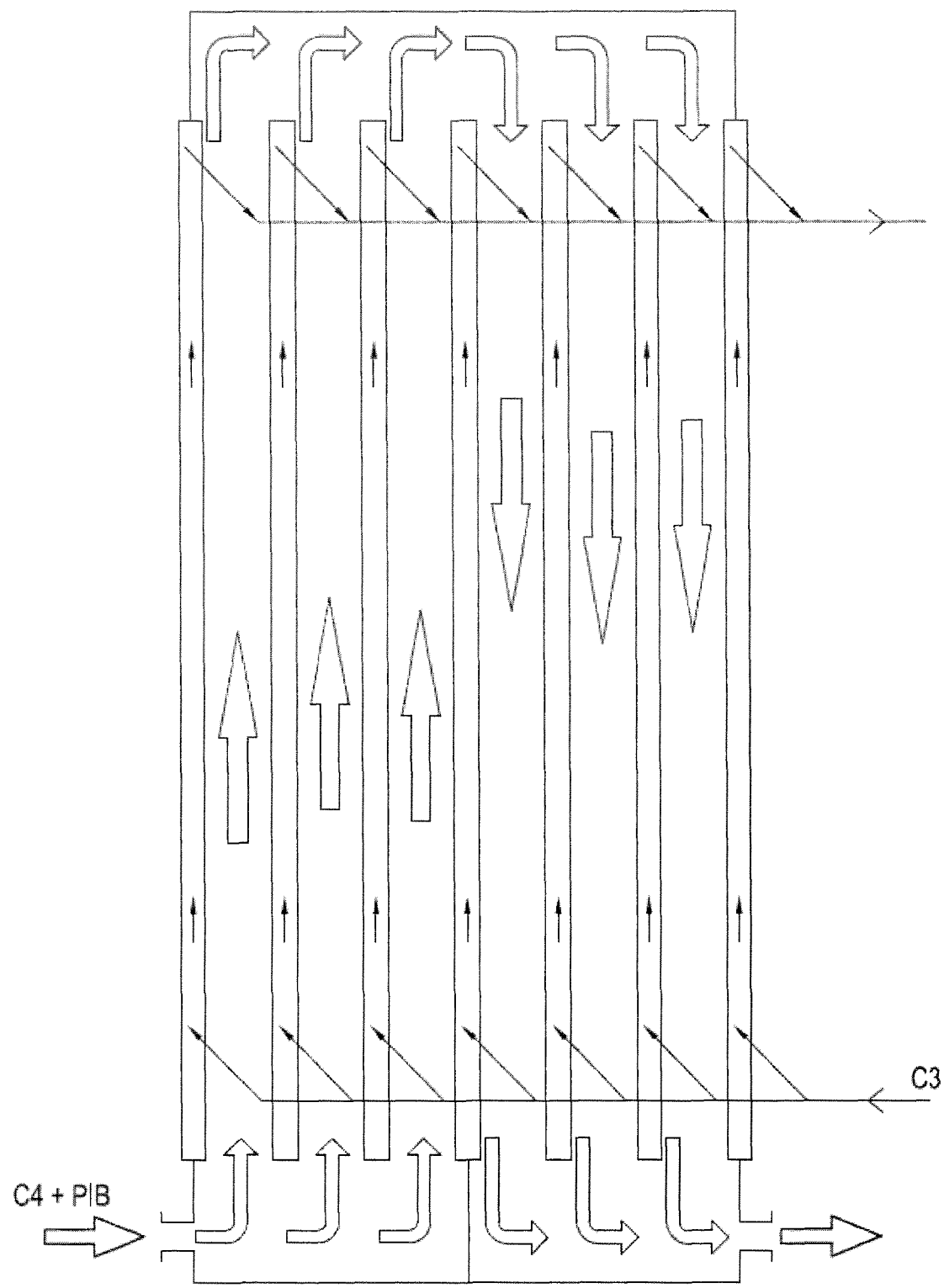

According to an embodiment of the present invention, the HERS is a platular reactor; in this platular configuration, the HERS' section(s) preferably comprises "n+1" passages which are parallelepipedic channels (for example rectangular section parallelepipedic channels) for the coolant, preferably the evaporative coolant. In such configuration, the «2.n» main plates of the "n" (n being an integer superior or equal to 1) parallelepipedic channel(s) (for example rectangular section parallelepipedic channels) for the reaction mixture are preferably shared with the corresponding «2.n» main plates of the parallelepipedic channel(s) (for example rectangular section parallelepipedic channels) for the coolant; in a configuration wherein the HERS comprises only one section, the two missing main plates of the parallelepipedic channel(s) for the coolant constitute each corresponding extremity of the HERS, as depicted in FIG. 2 according to the present invention.

HERS—Sections «x»

According to an embodiment of the present invention, the HERS comprises at least two sections, preferably "x" sections (x being an integer superior or equal to 2), the said sections being parallel and in series (preferably side by side).

HERS—Flow Paths

In said configuration, the flow path of the reaction mixture in a section is preferably opposite to the flow path of the reaction mixture in the next section ("serpentine flow path"). For example, if the flow path of the reaction mixture in the first section is ascending, its flow path in the next section will preferably be descending; the flow path of the reaction mixture in the last section is preferably descending. Whilst the present invention covers any appropriate direction for the said flow paths, e.g. oblique, horizontal or vertical, said path is preferably vertical as shown in FIGS. 1 and 2 according to the present invention.

A section preferably shares its last coolant passage/channel with the first coolant passage/channel of the next section.

Whilst the present invention covers any appropriate direction for the flow paths of the coolant in its "n+1" passages/channels (as long as said paths are unidirectionally parallel to the reaction mixture flow paths), e.g. oblique, horizontal or vertical, said path is preferably vertical as shown in FIG. 2 according to the present invention. According to a preferred embodiment of the present invention, the direction flow path of the evaporative coolant is ascending (e.g. from bottom to top of the coolant channels); it can be in the same or the opposite direction of the reaction mixture flow path in a reaction mixture section; it is preferably in the same direction of the reaction mixture flow path in the first reaction mixture section and, preferably, in the opposite direction of the reaction mixture flow path in the last reaction mixture section.

HERS—Number of Sections «x»

According to an embodiment of the present invention, "x" is preferably pair in order to reduce the dead volume of the reaction mixture piping system, i.e. by reducing the distance of the reaction mixture piping system between the inlet and the outlet of the HERS. In a preferred embodiment, x is equal to 2, 4, 6, 8, 10, 12, 14, 16, 18, 20 or a higher pair number, preferably 6, 8, 10 or 12, for example 8.

HERS—Number of «n» Channels

According to an embodiment of the present invention, the HERS' section(s) comprises "n" (n being an integer superior or equal to 1) parallelepipedic channels (for example rectangular section parallelepipedic channels) for the reaction mixture and "n+1" passages (for example rectangular section parallelepipedic channels) for the coolant. In a preferred embodiment, n is comprised between 2 and 20 (for example between 4 and 16). In a preferred embodiment n is equal to 2, 3, 4, 5, 6, 7, 8, 9, 10, 11, 12, 13, 14, 15, 16, or a higher integer, preferably 8, 9, 10, 11 or 12, for example 10.

The number of parallelepipedic channels "n" for the reaction mixture in each section can vary. The total number of parallelepipedic channels for the reaction mixture in the HERS is equal to sum of the said channels in each section; for example, if the number of parallelepipedic channels for the reaction mixture in a section i of the HERS is $n_i$, the total number of parallelepipedic channels for the reaction mixture in the HERS is equal to $\Sigma_{i=1}^{i=x} ni$. In a preferred embodiment, the number of parallelepipedic channels "n" for the reaction mixture in each section is the same. In this configuration the total number of parallelepipedic channels for the reaction mixture in the HERS is thus equal to "x" times "n" [(x.n)]; and the total number of passages (preferably paratlelepipedic channels) for the coolant in the HERS is thus preferably equal to "x" times "n" plus one [(x.n+1)]. In said last configuration, and according to a preferred embodiment of the present invention, the HERS comprises [2.(x.n)] main plates corresponding to the [(x.n)] parallelepipedic channels for the reaction mixture, said main plates being preferably shared with the corresponding [(x.n)] main plates of the parallelepipedic channel(s) for the coolant, the total number of main plates of the parallelepipedic channel(s) for the coolant being [2.(x.n)+2] (2 non shared plates constituting two opposite sides of the HERS, as depicted in FIG. 2 according to the present invention). For example, a HERS having 8 sections, with each section having 10 parallelepipedic channels for the reaction mixture, the total number of parallelepipedic channels (for example rectangular section parallelepipedic channels) for the reaction mixture in the HERS is thus equal to 80; and the total number of passages (preferably parallelepipedic channels (for example rectangular section parallelepipedic channels)) for the coolant in the HERS is thus preferably equal to 81. In said last configuration, and according to a preferred embodiment of the present invention, the HERS comprises 160 main plates corresponding to the 80 parallelepipedic channels for the reaction mixture, said main plates being preferably shared with the corresponding 160 main plates of the parallelepipedic channel(s) for the coolant, the total number of main plates of the parallelepipedic channel(s) for the coolant being 162 (2 non shared plates constituting two opposite sides of the HERS, as depicted in FIG. 2 according to the present invention).

HERS—Reaction Mixture Channels Dimensions

According to an embodiment of the present invention, the dimensions of the reaction mixture parallelepipedic channels (for example rectangular section parallelepipedic channels) are characterised by
- a first dimension, preferably the height, comprised between 2 and 10 m, preferably between 4 and 8 m, for example between 4.5 and 6.5 m, and/or
- a second dimension, preferably the depth, comprised between 0.1 and 3 m, preferably between 0.5 and 2 m, for example between 0.75 and 1.5 m, and/or
- a third dimension, preferably the width, comprised between 2 and 50 mm, for example between 4 and 45 mm, preferably between 8 and 35 mm, for example between 12 and 25 mm, for example 18 mm.

Whilst the present invention covers embodiments wherein reaction mixture channels can have different first and/or second dimensions, the said first and/or second dimensions (e.g. preferably the heights and/or the depths) are preferably identical in each individual section of the HERS, preferably identical in the HERS.

Whilst the present invention covers embodiments wherein reaction mixture channels can have different third dimensions, the said third dimensions (e.g. the widths) are preferably identical in each individual section of the HERS, preferably identical in the HERS.

Depending on the type of reaction mixture, the present invention encompasses embodiments where the widths in a section are smaller or larger than the widths in the next section.

According to an embodiment of the present invention, the reaction mixture side of the plates of the reaction mixture parallelepipedic channels can be corrugated or non-corrugated, preferably non-corrugated.

According to a preferred embodiment of the present invention, there is nothing except the liquid monomer(s) containing reaction mixture between the plates on the reaction mixture side; indeed, whilst reinforcing parts could be used between the said plates, they are preferably absent in order to avoid any negative interference of the flow path of the reaction mixture.

In an embodiment according to the present invention, small cavities or corrugations are tolerated, for example those generated on the reaction mixture plate side by the mechanical treatment (e.g. embossing and/or welding as explained hereafter) on the coolant plate side.

Whilst the HERS could theoretically comprise mobile elements (e.g. for mixing the reaction mixture feed), the said HERS does not comprise any mobile element according to a preferred embodiment of the present invention.

HERS—Coolant Channels Dimensions

According to an embodiment of the present invention, the dimensions of the coolant parallelepipedic channels (for example rectangular section parallelepipedic channels) are characterised by
- a first dimension, preferably the height, comprised between 2 and 10 m, preferably between 4 and 8 m, for example between 4.5 and 6.5 m, and/or
- a second dimension, preferably the depth, comprised between 0.1 and 3 m, preferably between 0.5 and 2 m, for example between 0.75 and 1.5 m, and/or
- a third dimension, preferably the width, comprised between 1 and 30 mm, preferably between 2 and 20 mm, for example between 5 and 16 mm, for example 8 mm. The said coolant channel width can advantageously be selected by ensuring a low pressure drop when simultaneously targeting the temperature difference which should preferably be lower than 3° C.

Whilst the present invention covers embodiments wherein coolant channels can have different first and/or second dimensions, the said first and/or second dimensions (e.g. preferably the heights and/or the depths) are preferably identical in each individual section of the HERS, preferably identical in the HERS. In a preferred embodiment according to the present invention, said first and/or second dimensions of the coolant channels are respectively identical to the first and/or second dimensions of the adjacent reaction mixture channels.

Whilst the present invention covers embodiments wherein coolant channels can have different third dimensions, the said third dimensions (e.g. the widths) are preferably identical in each individual section of the HERS, preferably identical in the HERS. For example, the widths of the first and of the last coolant channels of the HERS can be higher and/or lower than the width of the other coolant channels, preferably lower. Decreased or increased widths of the coolant channels from one section to its next section could also be used depending for example on the width of the adjacent reaction mixture channels and/or on the type of reaction mixture and/or on the type of coolant used and/or on the polymerisation rate in the adjacent reaction mixture channels.

HERS—Channels Widths and Volume Ratios

As depicted in FIG. 2, and this is a preferred embodiment according to the present invention, the width of the coolant channels (W-Cool) are smaller than the width of the reaction mixture channels (W-Reac), for example the ratio between W-Cool and W-Reac is lower than 0.8, preferably lower than 0.6, even lower than 0.5.

According to an embodiment of the present invention, the coolant side of the plates of the platular heat exchanger can be corrugated and/or non-corrugated. Said corrugation can be obtained by any appropriate technique which is well known to the man skilled in the art, e.g. by the blasting technique of the non-corrugated plates.

In an embodiment according to the present invention the coolant sides of the plates of the platular heat exchanger are mechanically tied together in order to provide the mechanical integrity to the whole HERS. Any appropriate technique can advantageously be used for providing said mechanical integrity. For example, reinforcing parts could be used between the said plates at spaced intervals without detrimentally impacting the flow and the action of the coolant. Another example can be provided by embossing and/or welding the said plates at spaced intervals; in such configuration, depending on the quality of the welding, small corresponding cavities and/or corrugations can be tolerated on the reaction mixture side plate.

According to an embodiment of the present invention, the ratio between the coolant channels volume and the reaction mixture channels volume in the HERS is lower than 0.8, preferably lower than 0.6, lower than 0.5, or even lower than 0.3.

HERS—Distribution Box

According to an embodiment of the present invention, the polymerisation loop can optionally and advantageously comprise a distribution box which connects the reaction mixture piping system to the reaction mixture inlet of the HERS as detailed hereafter in FIG. 1 which illustrates some corresponding embodiment. The main objective for using a distribution box consists in an improvement of the distribution of the circulation feed coming from the reaction mixture piping system to the reaction mixture inlet of the first HERS' section. This improvement is for example a distribution of the circulation feed across the whole depth and width of all the channels of the first HERS' section and/or a separation of the circulation pipe into several pipes in order to offer a better distribution. In an embodiment according to the present invention, the said distribution box is not located under the HERS; it is preferably located on the side of the HERS near the first section reaction mixture inlet as depicted in FIG. 1.

HERS—Collecting Box

According to an embodiment of the present invention, the polymerisation loop can optionally and advantageously comprise a collecting box which connects the reaction mixture outlet of the HERS (i.e. the circulation feed across the whole depth and width of all the channels of the last HERS' section) to the reaction mixture piping system as detailed hereafter in FIG. 1 which illustrates some corresponding embodiment.

In an embodiment according to the present invention, the said collecting box is not located under the HERS; it is preferably located on the side of the HERS near the last section reaction mixture outlet as depicted in FIG. 1.

For the purpose of the present invention and appended claims, the distribution and the collecting boxes, when used, will be considered as part of the reaction mixture piping system.

Reaction Mixture Piping System

According to an embodiment of the present invention, the length of the reaction mixture piping system is optimised. For example, it is represented by the distance between the reaction mixture outlet of the HERS and the reaction mixture inlet of the HERS which is advantageously lower than 5 m, for example lower than 4 m, preferably lower than 3 m, for example lower than 2.5 m.

HERS—Reaction Mixture Junction Zone (Box)

According to an embodiment of the present invention, a section is preferably connected to its next section by a reaction mixture junction zone.

The reaction mixture junction zone connects the "n" parallelepipedic channels for the reaction mixture feed of a section to the "n" parallelepipedic channels for the reaction mixture feed of the next section.

Preferably, each section (with the proviso of the last section) is connected to its next section by such reaction mixture junction zone.

A reaction mixture junction zone can have any appropriate design which favours the distribution of the reaction mixture coming from the channels of a section into the channels of the next section. In an embodiment of the present invention said reaction mixture junction zone may advantageously comprise a mixing/distributing element, for example a static element and/or Venturi type mixing element.

For the purpose of the present invention and appended claims, the reaction mixture junction zones (or boxes) will be considered as being part of the HERS. The said reaction mixture junction boxes advantageously contribute to the mechanical integrity of the HERS. In an embodiment according to the present invention, the reaction mixture junction boxes which are located at the bottom of the HERS form a bottom lid for the whole HERS bottom surface. In an embodiment according to the present invention, the reaction mixture junction boxes which are located at the top of the HERS form a top lid for the whole HERS top surface. In an embodiment according to the present invention, the said bottom and top lids can be dismantled from the HERS' sections (the core of the HERS) in order to facilitate the cleaning of the HERS' plates when necessary.

HERS—Reaction Mixture Inlet Box

According to an embodiment of the present invention, a reaction mixture inlet box is preferably located in the HERS just before the first section of the HERS, preferably at the bottom of the said section as depicted in FIGS. 1 and 2 of the present invention. Said reaction mixture inlet box is used for connecting the HERS reaction mixture inlet and the first reaction mixture section of the HERS.

HERS—Reaction Mixture Outlet Box

According to an embodiment of the present invention, a reaction mixture outlet box is preferably located in the HERS just after the last section of the HERS, preferably at the bottom of the said section as depicted in FIGS. 1 and 2 of the present invention. Said reaction mixture outlet box is used for connecting the last reaction mixture section of the HERS to the HERS reaction mixture outlet.

For the purpose of the present invention and appended claims, the junction, inlet and outlet boxes will be considered as part of the HERS.

According to an embodiment of the present invention, the cumulated volume of the junction, inlet and outlet boxes is lower than 30% of the HERS' volume, preferably lower than 25%, for example lower than 18%.

Monomers

There is no restriction regarding the selection of liquid monomer(s) which can advantageously be polymerised in the ionic polymerisation process according to the present invention. Whilst the cationic polymerisation is preferably used according to the present invention, anionic polymerisation could also be used.

Typical examples of monomers that can be used according to the present invention are styrene, dienes, methacrylate, vinyl pyridine, aldehydes, epoxide, episulfide, cyclic siloxane, lactones, acrylonitrile, cyanoacrylate, propylene oxide, vinyl ketone, acrolein, vinyl sulfone, vinyl sulfoxide, vinyl silane and/or isocyanate; and/or olefins and/or terpenes (for example alpha-pinene and/or beta-pinene) or heterocyclic monomers example oxirane, tetrahydrofuran, thietane, oxetan-2-one, 1,3-dioxepane, and/or oxazoline).

In a preferred embodiment according to the present invention, the liquid monomer(s) are selected amongst linear alkenes, for example ethylene, propylene, n-butenes (for example 1-butene and/or 2-butene), n-pentcnes (for example 1-pentene and/or 2-pentene), n-hexenes (for example 1-hexene, 2-hexene and/or 3-hexene), isoalkenes (for example isobutene, 2-methylbutene-1, 2-methylpentene-1, 2-methylhexene-1, 2-ethylpentene-1, 2-ethylhexene-1, iso-octene and/or 2-propylheptene-1), octenes, decenes, dodecenes, alkadienes (for example butadiene and/or isoprene), cycloalkenes (for example cyclopentene and/or cyclohexene and/or cyclopentadiene and/or dicyclopentadiene), vinyl aromatic compounds (for example styrene, alpha-methylstyrene, 2-methyl-styrene, 3-methyl-styrene, 4-methyl-styrene, 4-tert-butylstyrene, 2-chlorostyrene, 3-chlorostyrene and/or 4-chlorostyrene), and/or olefins which have a silyl group (for example 1-trimethoxysilylethene, 1-(trimethoxysilyl)propene, 1-(trimethoxysilyl)-2-methylpropene-2, 1-[tri(methoxyethoxy)silyl]ethene, 1-[tri(methoxyethoxy)silyl]propene and/or 1-[tri(methoxyethoxy)silyl]-2-methylpropene-2), and/or mixtures of two or more of any of the preceding monomers.

Preferred monomers are isobutene, isobutenic monomer mixtures, vinylaromatic compounds such as styrene, styrenic monomer mixtures, styrene derivatives, especially α-methylstyrene and 4-methylstyrene, the abovementioned cycloalkenes, the abovementioned alkadienes and mixtures thereof.

In a preferred embodiment according to the present invention, the liquid monomer(s) are selected amongst isoprene, isobutene, isobutenic monomer mixtures, vinylaromatics, especially styrene and styrenic monomer mixtures, and/or mixtures of two or more of any of the preceding monomers. Isobutene, styrene and/or mixtures thereof are preferably used as monomers in the polymerisation process according to the invention, isobutene (and/or isobutenic monomer mixtures) being most preferred.

In an embodiment according to the present invention, pure isobutene is used. The isobutene and/or isobutenic monomer mixture which is polymerised may advantageously come from a C4 hydrocarbon stream (for example C4 raffinates, C4 cuts from isobutene dehydrogenation, C4 cuts from steamcrackers and/or C4 cuts from FCC crackers and/or isobutylene obtained by cracking MTBE and/or tBA (tert-butyl-alcohol)).

In an embodiment according to the present invention, when the monomer to be polymerised (e.g. isobutylene) is comprised in a monomer mixture, the content of said monomer to be polymerised (e.g. isobutylene) in the said monomer mixture is at least about 30 weight %.

For example, when a C4 raffinate is used, its 1-butene is preferably hydroisomerised in 2-butene.

For example, a C4 cuts from FCC crackers may also be used.

The isobutenic monomer mixture may comprise small amounts of contaminants, such as water, carboxylic acids, acetonitrile, acetone, disulfides and/or mineral acids; said contaminants may advantageously be removed from the isobutenic monomer mixture, for example by adsorption on solid adsorbents such as activated carbon, molecular sieves, alumina and/or ion exchangers.

The content of the monomer (e.g. isobutylene) to be reacted in the reaction mixture entering in the HPPU according to the present invention will advantageously be superior to 10 weight percent; higher monomer to be polymerised concentration (e.g. isobutylene) can also be used, for example higher than 20 weight percent or even higher than 30 weight % in the reaction mixture.

The remainder components of the reaction mixture feed usually comprise—or advantageously consist of—the polymer(s), the catalyst system (with or without electron donor(s) as defined hereafter) and optionally and/or preferably one or more non-reactive hydrocarbon diluents, e.g. preferably alkane(s) diluents.

When a pure isobutylene feed is used, it must advantageously be diluted with a solvent (e.g. one or more non-reactive hydrocarbon diluents) to reduce the viscosity of the reaction mixture and the pressure drop.

Monomers—Point of Introduction

There is no restriction regarding the points of introduction of the liquid monomer(s) in the polymerisation process according to the present invention.

In an embodiment according to the present invention, most of (preferably all of the liquid monomer(s)) is introduced in the HPPU. In non-preferred embodiments according to the present invention, some of the liquid monomer(s) is introduced in the reaction mixture piping system of the second polymerisation unit itself, for example between the circulating pump and the reaction mixture inlet of the HERS, and/or in the distribution box which connects the recirculation pipe to the reaction mixture inlet of the HERS, and/or in the reaction mixture inlet box, and/or in a junction zone: in a corresponding embodiment, part of the liquid monomer(s) is introduced in at least one reaction mixture junction zone, i.e. a reaction mixture junction zone which connects the "n" parallelepipedic channels for the reaction mixture feed of a section to the "n" parallelepipedic channels for the reaction mixture feed of the next section; such introduction is preferably performed in one, two, or more or all of the reaction mixture junction zones, for example as depicted in FIG. 1 in all the junction zones which are located at the bottom of the HERS.

In an embodiment according to the present invention, part of the liquid monomer(s) is introduced in at least one reaction mixture junction zone and in the reaction mixture inlet box, and/or in the distribution box and/or in the reaction mixture piping system between the circulating pump and the reaction mixture inlet of the HERS.

In an embodiment according to the present invention, the HPPU is located according to its position as illustrated in FIGS. 1.a (OPTION 1), 1.b (OPTION 2) and/or 1.c (OPTION 3).

In an embodiment according to the present invention, the HPPU is located within the polymerisation loop, for example forming an integral part of the reaction mixture piping system which is connected to an inlet and an outlet of the HERS.

In an embodiment according to the present invention, the ratio between the internal volume of the piping (Vext) which connects the outlet of the HPPU to the second polymerisation unit and the internal volume (Vhppu) of the reaction mixture passages of the HPPU is lower than three, preferably lower than two, for example lower than one (Vext/Vhppu<3; Vext/Vhppu<2; Vext/Vhppu<1).

In an embodiment according to the present invention, the piping which connects the reactant outlet of the HPPU to the second polymerisation unit is thermally isolated and/or thermally controlled (e.g. by using a refrigeration system). In an embodiment according to the present invention, the difference between the reactant temperature at the outlet of the HPPU (Thppu) and the temperature of the said reactant at its point of introduction in the second polymerisation unit (Tin) is lower than 10° C., preferably lower than 5° C., for example lower than 2° C. ([Thppu-Tin]<10° C.; [Thppu-Tin]<5° C.; [Thppu-Tin]<2° C.).

Catalyst System

In an embodiment according to the present invention, the liquid monomer(s) containing reaction mixture comprises a catalyst system. The corresponding ionic polymerisation is preferably a cationic polymerisation of the liquid monomer(s) containing reaction mixture.

The catalyst system preferably consists in a Lewis acid co-initiator system, i.e. a Lewis acid acting as a co-initiator (often identified as the catalyst or activator) preferably together with an initiator.

Point of Introduction

There is no restriction regarding the point of introduction of the catalyst system in the polymerisation process according to the present invention.

In a preferred embodiment according to the present invention, the whole of the catalyst system components are introduced in the HPPU.

In an alternative embodiment according to the present invention, part of the catalyst system components are introduced separately in the polymerisation loop, for example at one location or at different locations in the reaction mixture piping system itself and/or at one location or at different locations in the HERS (as illustrated in the figures).

In an embodiment of the present invention, the initiator is premixed with the liquid monomer before being brought into contact with the co-initiator.

In an alternative or additional embodiment according to the present invention, part of a catalyst system component (preferably the co-initiator) is introduced in the reaction mixture piping system, preferably between the reaction mixture outlet of the HERS and the recirculation pump, preferably at a distance of the pump which is smaller than half of the distance between the reaction mixture outlet of the HERS and the recirculation pump, more preferably smaller than a third, for example smaller than a fourth.

In an alternative or additional embodiment according to the present invention, part of a catalyst system component (preferably the co-initiator) is injected in at least one reaction mixture junction zone, preferably a reaction mixture junction zone wherein no fresh liquid monomer is injected.

The present invention also provides a process for controlling the molecular weight distribution of the polymer
- by varying the flow rates of the liquid monomer at its point(s) of introduction (for example as depicted in FIG. 1 and shown in FIGS. 3 to 5), and/or
- by varying the flow rate of the catalyst at its points of introduction, and/or
- by varying the recirculation ratio in the polymerisation loop.

Thus, the present invention also provides the use of a polymerisation process according to any of the appended process claims for controlling the molecular weight distribution of the polymer produced in a unit according to any of the appended unit claims
- by varying the flow rates of the liquid monomer at its point(s) of introduction, and/or
- by varying the flow rate of the catalyst at its points of introduction, and/or
- by varying the recirculation ratio in the polymerisation loop.

Prepolymerisation

According to the present invention, part or all of the liquid reaction mixture which enters the second polymerisation unit has already been subjected to a prepolymerisation stage in the HPPU. Said prepolymerisation can be performed in any appropriate prepolymerisation unit wherein the liquid monomer(s) is brought into contact with a catalyst system. There is no specific restriction regarding the prepolymerisation time for said optional reaction; for example, a contact time of at least 1 sec between the liquid monomer(s) and all the components of the catalyst system, for example between 1 and 100 seconds or between 2 and 50 seconds may be appropriate. In an embodiment of the present invention, the whole of the catalyst system required for the polymerisation is introduced during the said prepolymerisation stage; alternatively, some additional catalyst component(s) can be introduced in the polymerisation loop of the second polymerisation unit at any or more than one or all of the locations already described here above. In an embodiment of the present invention, the whole of the liquid monomers) required for the polymerisation is introduced during the said prepolymerisation stage; alternatively, some fresh liquid monomer(s) can be introduced in the polymerisation loop of the second polymerisation unit at any or more than one or all of the locations already described here above.

According to an embodiment of the present invention, the material used for the HPPU reactor is selected amongst ceramic materials (e.g. silicon carbide and/or tungsten carbide), glass, Monel alloys (e.g. M400), carbon steel grades, alloy steel grades and/or stainless steel grades; ceramic materials are preferred.

In an embodiment according to the present invention, the homogenising prepolymerisation unit ("HPPU") reactor is a fluidic device, preferably a fluidic device over a scale ranging from microns to a few millimeters, that is, devices with fluid channels the smallest dimension of which is in the range of microns to a few millimeters, and preferably in the range of from about 50 microns to about 8.0 millimeters, for example in the range of from about 1.0 millimeter to about 3.0 millimeters. When the characteristic dimension of such fluidic device is defined as the smallest dimension perpendicular to the reaction mixture flow direction, the characteristic dimension of a fluidic device according to the present invention is comprised between 50 microns and 8.0 millimeters, for example between 400 microns and 7.0 millimeters, for example between 1.0 millimeter and 5.5 millimeters, for example between 1.0 millimeter and 3 millimeters.

In an embodiment according to the present invention, the homogenising prepolymerisation unit ("HPPU") reactor is a fluidic device which includes at least one reaction mixture passage and one or more thermal control passages, the one or more thermal control passages being positioned and arranged within two volumes each bordered by a wall, the walls being planar and parallel to one another, the reaction mixture passage positioned between said planar walls and defined by said planar walls and walls extending between said planar walls being preferably in the micrometer to millimeter range.

In an embodiment according to the present invention, the homogenising prepolymerisation unit ("HPPU") reactor is characterised by a superior mixing performance at molecular scale, i.e. mixing performance characterised by a UV transmission value which is greater than 80% according to the Villermaux test. For the purpose of the present invention and appended claims, the said mixing performance can conveniently be measured by the method described in Villermaux J., et al. "Use of Parallel Competing Reactions to Characterize Micro Mixing Efficiency," AIChE Symp. Ser. 88 (1991) 6, p. 286. In summary, the process was to prepare, at room temperature, a solution of acid chloride and a solution of potassium acetate mixed with KI (Potassium Iodide). Both of these fluids were then continuously injected by means of a syringe or peristaltic pump into the HPPU to be tested. The resulting test reaction results in two competing reactions of different speeds—a "fast" reaction that produces a UV absorbing end product, and an "ultrafast" one that dominates under ultrafast mixing conditions, producing a transparent solution. Mixing performance is thus correlated to UV transmission through the mixed fluid, with a theoretically perfect or 100% fast mixing yielding a 100% UV transmission in the resulting product.

An example of a typical HPPU reactor design which could advantageously be used according to an embodiment of the present invention can be found in WO2009009129 (Corning Incorporated).

As already mentioned, the catalyst system used in the present invention preferably consists in a Lewis acid co-initiator system, i.e. a Lewis acid acting as a co-initiator (often identified as the catalyst or activator) together with an initiator. The presence of an initiator like the ones disclosed hereafter is not always mandatory; indeed, some catalysts don't necessarily need the presence of such initiator. For example, the presence of impurities (for example water) in the reaction mixture feed can suffice to initiate the reaction.

Co-Initiator

In an embodiment according to the present invention, the co-initiator is selected amongst metal halides, for example from aluminium, boron, titanium, tin, zinc, vanadium, antimony, zirconium and/or iron halides.

In a preferred embodiment according to the present invention, the metal halides are selected amongst dialkylaluminium chlorides, monoalkylaluminium dichlorides, aluminium trichloride, boron trichloride, boron trifluoride, titanium tetrachloride, tin tetrachloride, zinc dichloride, vanadium pentachloride, and/or iron trichloride, and/or mixtures of two or more of any of the preceding co-initiators.

In a preferred embodiment according to the present invention, the co-initiator is selected amongst ethylaluminum dichloride, titanium tetrachloride, boron trichloride, most preferably ethylaluminum dichloride (EADC).

Initiator

There is no restriction regarding the selection of the initiator to be used in the present invention. In an embodiment according to the present invention, the initiator is a compound, preferably an organic compound, which has at least one functional group which forms a carbocation or a cationic complex with the Lewis acid under polymerisation conditions; said organic compound initiators have usually at least one nucleophilic displaceable leaving group which can stabilize a positive or partial charge on the carbon atom which bears the said leaving group.

Examples of initiators and processes for their preparation are well known and have been extensively described in the prior art. Illustrative examples of initiators which can advantageously be used in the present invention are: tert-butyl chloride, diisobutyl chloride, cyclopentenyl(s), cyclohexenyl(s), cycloheptenyhs), cyclooctenyl(s), cumyl chloride, dicumyl chloride, allyl chloride, methallyl chloride, 2-chloro-2-methylbutene-2, 2,5-dichloro-2,5-dimethylhexene-3, limonene dihydrochloride, limonene dihydrobromide, chloroethyl-chlorocyclohexane(s), bromoethyl-bromocyclohexane(s), 2-chloro-2-(1-methylcyclohexen-4-yl) propene, 2-chloro-2-methylbutene-3, 2-chloro-2-methylpentene-4, 2-chloro-2,4,4-trimethylhexene-5, 2-chloro-2-methyl-3-(cyclopenten-3-yl)propane, triphenylmethyl fluoride, 2-chloro-2-methyl-4-(cyclohexen-4-yl)pentane, 3-chlorocyclopentene, and/or mixtures of two or more of any of the preceding initiators. Additional examples of initiators are water, HCl, carboxylic acid(s) (e.g. acetic acid), alcohols (e.g. Cumyl alcohol, phenol, methanol), also known as protogens. Additional examples of initiators are tert-Butylchloride, Cumyl (2-Phenyisopropyl)-chloride, para-dicumyl-chloride, 2,2,4-Trimethylpentylchloride, triphenylmethyl chloride, esters, ethers, anhydrides, tert-Butylether (MTBE), diisopropylether, tert-Butylester, Cumylester, Butylacetate, Nitroethane, Acetone, also known as cationogens.

In a preferred embodiment according to the present invention, the initiator is tert-butyl chloride (t-BuCl).

Ratios Co-Initiator/Initiator

In an embodiment according to the present invention, for example in the case of polyisobutylene, the molar ratio of co-initiator (for example EADC) to initiator (for example t-BuCl) in the catalyst system may be comprised between 0.06 to 50, for example 0.5 to 5, preferably between 0.5 to 2, and more preferably between 0.5 to 1.

In an embodiment according to the present invention, for example in the case of polyisobutylene, the amount of co-initiator (for example EADC) introduced into the polymerisation process is comprised between 0.01 and 2 millimoles per mole of isobutylene introduced into the polymerisation process, preferably between 0.04 and 0.5 millimoles per mole of isobutylene introduced.

Electron Donors

In an embodiment according to the present invention, the reaction mixture also comprises one or more electron donor(s). There is no restriction regarding the selection of the electron donor to be used in the present invention. In an embodiment according to the present invention, the electron donor is selected amongst aprotic organic compounds which have a free electron pair on a nitrogen, oxygen or sulphur atom. Illustrative examples of electron donors are pyridines, amides, lactams, ethers, amines, esters, thioethers, sulfoxides, nitrites, phosphines, and/or unpolymerizable, aprotic organic silicon compounds which have at least one organic radical bonded via oxygen, and/or mixtures of two or more of any of the preceding electron donors; all the above cited compounds can also be advantageously substituted, for example alkyl-substituted.

Examples of electron donors and processes for their preparation are well known and have been extensively described in the prior art. Illustrative examples of electron donors which can advantageously be used in the present invention are isopropyl ether, butyl ether, MTBE, dimethylacetamide (DMA), and/or mixtures of two or more of any of the preceding electron donors.

Each individual component of the reaction mixture according to the present invention is preferably liquid under the polymerisation conditions; for example, when the catalyst system, the co-initiator, the initiator and/or the electron donor are not liquid, they are preferably dissolved in a solvent.

Solvents

When a solvent is present in the reaction mixture composition, it is preferably selected amongst hydrocarbons, for example
- acyclic alkanes having from 2 to 8 carbon atoms (for example ethane, propane, butane(s), pentane(s), hexane(s), heptane(s), octane(s) and/or mixtures of two or more of any of the preceding solvents),
- cyclic alkanes having from 5 to 8 carbon atoms (for example cyclopentane, methyl-cyclopentane, cyclohexane, methyl-cyclohexane, cycloheptane, and/or mixtures of two or more of any of the preceding solvents),
- acyclic alkenes having from 2 to 8 carbon atoms (for example ethylene, propylene, n-butene, n-pentene, n-hexene, n-heptene, and/or mixtures of two or more of any of the preceding solvents),
- cyclic olefins such as cyclopentene, cyclohexene, cycloheptene, and/or mixtures of two or more of any of the preceding solvents,
- aromatic hydrocarbons such as toluene, xylene, ethylbenzene, and/or mixtures of two or more of any of the preceding solvents,
- halogenated hydrocarbons (for example halogenated aliphatic hydrocarbons such as chloromethane, dichloromethane, trichloromethane, chloroethane, 1,2-dichloroethane, 1,1,1-trichloroethane, 1-chlorobutane, and/or mixtures of two or more of any of the preceding solvents),
- halogenated aromatic hydrocarbons (for example chlorobenzene, fluorobenzene. 1,2-dichlorobenzene, and/or mixtures of two or more of any of the preceding solvents),
- and/or mixtures of two or more of any of the preceding solvents.

Chlorobutane, methylene chloride, hexane, heptane, and/or mixtures of two or more of any of the preceding solvents are preferably used as solvents.

Solvents mixtures may also happen during the mixture of the different components of the reaction mixture, such as the monomer and/or catalyst system and/or initiator and/or co-initiator and/or electron donor. Indeed, the most suitable solvent for an individual reaction mixture component may differ from the most suitable solvent for another individual reaction mixture component, in which case a solvent mixture will be formed after mixing of the two reaction mixture components.

Process

The present invention relates to a (fast) ionic polymerisation process of liquid monomer(s) containing reaction mixture for the production of the corresponding polymer(s) in a cascade polymerisation unit according to the present invention.

In particular, according to an embodiment of the present invention, the present invention also relates to the second stage process which is a ionic polymerisation loop process for the polymerisation of a liquid monomer(s) containing reaction mixture (for example of isobutylene) in the second polymerisation unit which comprises a polymerisation loop, a coolant loop and a heat exchanger reactor system ("HERS") which is shared amongst the polymerisation loop and the coolant loop wherein the polymerisation loop comprises a polymer withdrawal system and a reaction mixture piping system which comprises a circulating pump and which is connected to an inlet and an outlet of said HERS and wherein the coolant loop comprises a coolant piping system connected to an inlet and an outlet of said HERS, characterised in that
1. the HERS comprises at least one section in which both the reaction mixture and the coolant are circulated,
2. the said HERS' section(s) comprises "n" (n being an integer superior or equal to 1) parallelepipedic channel(s) wherein the reaction mixture is circulated and "n+1" passages wherein the coolant is circulated,
3. the flow paths of the reaction mixture in the "n" channel(s) of a section are unidirectionally parallel,
4. the flow paths of the coolant in the "n+1" passages of a section are unidirectionally parallel to the reaction mixture flow paths, and
5. wherein the coolant is not in direct contact with the reaction mixture.

The reaction mixture according to the present invention comprises e.g. the monomer(s) and the catalyst system as further defined in the preceding description.

More particularly, in an alternative embodiment, the present invention also relates to the second stage process which is a ionic polymerisation loop process for the polymerisation of a liquid monomer(s) containing reaction mixture (for example of isobutylene) in the second polymerisation unit which comprises a polymerisation loop, a coolant loop and a heat exchanger reactor system ("HERS") which is shared amongst the polymerisation loop and the coolant loop wherein the polymerisation loop comprises a polymer withdrawal system and a reaction mixture piping system which comprises a circulating pump and which is connected to an inlet and an outlet of said HERS and wherein the coolant loop comprises a coolant piping system connected to an inlet and an outlet of said HERS, characterised in that
1. the HERS comprises at least one section in which both the reaction mixture and the coolant are circulated,
2. the said HERS' section(s) comprises "n" (n being an integer superior or equal to 1) parallelepipedic channel(s) wherein the reaction mixture is circulated and "n+1" passages wherein the coolant is circulated,
3. the flow paths of the reaction mixture in the "n" a section are unidirectionally parallel,
4. the flow paths of the coolant in the "n+1" passages of a section are unidirectionally parallel to the reaction mixture flow paths,
5. the coolant is not in direct contact with the reaction mixture, and
6. the temperature difference of the coolant between any point within the coolant side of the HERS is lower than 3° C.

In said embodiment, the temperature difference of the coolant between any point within the coolant side of the HERS is thus lower than 3° C., preferably lower than 2.5° C., lower than 2° C., lower than 1.5° C., for example lower than 1° C.

The control of the temperature within the coolant side of the HERS is a preferred feature according to the present invention. This can be controlled e.g. by the size of the "n+1" passages for the coolant and/or the flow rate of the coolant and/or the type of coolant.

According to an alternative embodiment, the present invention also relates to the second stage process which is a ionic polymerisation loop process for the polymerisation of a liquid monomer(s) containing reaction mixture (for example of isobutylene) in the second polymerisation unit which comprises a polymerisation loop, a coolant loop and a heat exchanger reactor system ("HERS") which is shared amongst the polymerisation loop and the coolant loop wherein the polymerisation loop comprises a polymer withdrawal system and a reaction mixture piping system which comprises a circulating pump and which is connected to an inlet and an outlet of said HERS and wherein the coolant loop comprises a coolant piping system connected an inlet and an outlet of said HERS, characterised in that 1. the HERS comprises at least one section in which both the reaction mixture and the coolant are circulated,
2. the said HERS' sections) comprises "n" (n being an integer superior or equal to 1) parallelepipedic channel(s) wherein the reaction mixture is circulated and "n+1" passages wherein the coolant is circulated and at least partially evaporated,
3. the flow paths of the reaction mixture in the "n" channel(s) of a section are unidirectionally parallel,
4. the coolant is an evaporative coolant,
5. the flow paths of the evaporative coolant in the "n+1" passages of a section are unidirectionally parallel to the reaction mixture flow paths,
6. the coolant is not in direct contact with the reaction mixture, and
7. the coolant piping system comprises a coolant liquefaction system.

Polymerisation Conditions

Ratios S/V

According to an embodiment of the present invention, the HERS is characterised by a ratio of surface area to reaction mixture volume ("S/V" expressed in m2/m3)
- higher than 10, higher than 20, preferably higher than 40, for example higher than 60, and/or
- lower than 750, for example lower than 600, lower than 450, preferably lower than 350, for example lower than 160.

These relatively low values of S/V ratios for the HERS according to the present invention compared to the plate and shell or platular reactors of the prior art are due to the importance of the reaction mixture volume which is maximised in the present invention.

According to an embodiment of the present invention, the HPPU reactor is characterised by a ratio of surface area to reaction mixture volume ("S/V" expressed in m2/m3) higher than 600, for example higher than 750, preferably higher than 900, preferably comprised between 1000 and 5000, for example comprised between 1000 and 3500.

Volumetric Heat Transfer Coefficient

According to an embodiment of the present invention, the HERS is characterised by a volumetric heat transfer coefficient (expressed in MW/m3.K)
- higher than 0.004, higher than 0.008, preferably higher than 0.015, for example higher than 0.03, and/or
- lower than 0.4, lower than 0.2, preferably lower than 0.1, for example lower than 0.07.

According to an embodiment of the present invention, the HPPU reactor is characterised by a volumetric heat transfer coefficient (expressed in MW/m3.K)
- higher than 0.5, preferably higher than 0.75, for example higher than 0.95 and/or
- lower than 3.0, preferably lower than 2.5, for example lower than 2.0.

Reaction Temperature

The HERS reaction temperature is defined as the lowest temperature at which the polymerization is carried out in the HERS. There is no restriction regarding the selection of the said temperature as long as the polymerisation takes place. In an embodiment according to the present invention, the said temperature is lower than 100° C., preferably lower than 50° C., even more preferably lower than 30° C., for example lower than 20° C., and/or higher than −90° C., preferably higher than −40° C., even more preferably higher than −30° C., for example higher than −20° C.

According to an embodiment of the present invention, the HPPU reaction temperature is defined as the lowest temperature at which the polymerization is carried out in the HPPU. In an embodiment according to the present invention, the said temperature is lower than 10° C., preferably lower than 0° C., even more preferably lower than −5° C., for example lower than −10° C., and/or higher than −60° C., preferably higher than −50° C., even more preferably higher than −40° C., for example higher than −30° C.

Coolant Temperature

The HERS coolant temperature is defined as the average temperature at which the coolant is introduced in the HERS. There is no restriction regarding the selection of the said temperature as long as the coolant efficiently absorbs the calories generated on the polymerisation side of the HERS. In an embodiment according to the present invention, the said temperature is lower than 90° C., preferably lower than 40° C., even more preferably lower than 20° C., for example lower than 5° C., and/or higher than −100° C., preferably higher than −50° C., even more preferably higher than −40° C., for example higher than −30° C.

According to an embodiment of the present invention, the HPPU coolant temperature is defined as the average temperature at which the coolant is introduced in the HPPU. In an embodiment according to the present invention, the said temperature is lower than 0° C., preferably lower than −10° C., even more preferably lower than −15° C., for example lower than −20° C., and/or higher than −70° C., preferably higher than −60° C., even more preferably higher than −50° C., for example higher than −40° C.

Reaction Pressure

In an embodiment according to the present invention, the polymerization is typically effected under atmospheric pressure, but it may also proceed under reduced or elevated pressure. A suitable pressure range is between 1 and 25 bar. In a preferred embodiment according to the present invention, the reaction mixture pressure in the HERS is comprised between 5 and 12 bars, preferably between 6 and 10 bars. According to an embodiment of the present invention, the reaction mixture pressure in the HPPU is also comprised between 5 and 20 bars, preferably between 6 and 10 bars.

Mn

In the case of polyisobutylene (PIB) production according to the present invention, the final PIB polymer essentially consists of repeating units of isobutylene. Depending on the composition of the liquid monomer(s) containing reaction mixture used in the present invention, the resulting PIB may also contain minor amounts of material derived from 1-butenes, butadiene or other C4 olefins (for example 2-butenes (cis and/or trans)). In a preferred embodiment according to the present invention, the PIB polymer is more than 99% by weight derived from isobutylene monomer. The number average molecular weight (Mn) of the PIB can advantageously be comprised between 300 and 500,000 g mol-1. There is no restriction regarding the type of PIB which can be produced according to the present invention; for example, mid-range vinylidene polymer and/or highly reactive PIB can be advantageously produced.

The viscosity of the reaction mixture increases during the polymer formation process. Full conversion to obtain low molecular weight polymer (e.g. PIB) will keep the reaction mixture viscosity manageable (e.g. 4 to 10 cSt at 10° C.).

The Reynolds number inside the process side of the HERS must be sufficiently high to ensure a high heat transfer coefficient (which is proportional to its power $0.8//(Re^{0.8})$). The more the viscosity increases, the more the theoretical reaction mixture flow rate should also increase in order to achieve said Reynolds number; Alternatively and/or additionally, in order to avoid the use of excessive reaction mixture flow rates (or velocities), it may be necessary (e.g. in the case of high molecular weight polymers) to lower the viscosity of the reaction mixture, for example by reducing the reaction mixture conversion rate and/or by using a diluent.

Polydispersity

Polydispersity—An embodiment according to the present invention consists in the superior control of the narrow polydispersity of the resulting polymer. For the purpose of the present invention and appended claims, polydispersity of a polymer product is defined as the ratio of the weight average molecular weight (Mw) divided by the number average molecular weight (Mn) of the polymer (PD=Mw/Mn). Whilst not wishing to be bound by this theory, the Applicants believe that their superior polydispersity has been obtained by a combination of a strict control of the thermal conditions within the HERS together with the specific design of the cascade polymerisation unit of the present invention (e.g. points of introduction of fresh feed and/or catalyst system components). In particular, the preparation of low polydispersity polymer product with an unexpected lowering of unwanted low and/or high molecular weight polymers in the said product is now possible thanks to the present invention. In an embodiment according to the present invention, for example in the case of polyisobutylene, the polydispersity of the polymer product may advantageously be controlled at values which are lower than 4.0, for example lower than 2.0, preferably lower than 1.7; values lower than 1.6, 1.5, or even 1.4 could also be advantageously be obtained.

Residence Times

Residence times—The residence time of the reaction mixture in the polymerisation loop (which is calculated by dividing the volume of the reactor by the volumetric feed rate) is preferably in the range from 5 sec to 120 min, more preferably in the range from 10 sec to 100 min, even more preferably in the range from 1 min to 100 min, even more preferably in the range from 2 min to 90 min and especially in the range from 10 min to 60 min.

The residence time of the reaction mixture in the HPPU reactor (which is calculated by dividing the volume of the reactor by the volumetric feed rate) is preferably in the range from 0.5 sec to 200 seconds, more preferably in the range from 1 sec to 100 sec, even more preferably in the range from 2 seconds to 50 seconds, and especially in the range from 3 seconds to 25 seconds.

Recirculation Ratios

In an embodiment according to the present invention, the recirculation ratio (which is calculated as the volumetric flow rate ratio of the reaction mixture volumetric flow rate in the polymerisation loop (in m3/h) to the volumetric flow rate of the polymer mixture withdrawal from the loop (in m3/h)) is comprised between 5 and 50, preferably between 10 and 40, for example between 15 and 30.

Linear Velocity

In an embodiment according to the present invention, the linear velocity (which refers to the velocity of the reaction mixture in the channels of the HERS and which is preferably calculated by dividing the volumetric flow rate of the reaction mixture in the polymerisation loop (in m3/h) by the cross-sectional area of the n channels of the first section) is comprised between 0.5 and 10 m/s, preferably between 1 and 5 m/s, for example between 1.5 and 2.5 m/s.

In an embodiment according to the present invention, the control of the volumetric flow rate of the reaction mixture in the polymerisation loop (in m3/h) is obtained thanks to the circulating pump which is preferably driven by a motor with a variable speed drive. Said circulating pump can for example be selected amongst circulators or centrifugal pumps. The pump operates at a pressure differential, delta P, to recirculate the reaction mixture in the HERS across the polymerisation loop.

The polymer withdrawal can be done at one or more locations in the polymerisation loop, preferably in the reaction mixture piping system, for example downstream of the circulating pump.

The polymer which is withdrawn is preferably quenched by any appropriate technique which is well known by the man skilled in the art, e.g. by using a material capable of killing the catalyst, such as, for example, ammonium hydroxide and/or NaOH.

When the coolant is an evaporative coolant, which represents the most preferred embodiment of the present invention, the said coolant preferably enters the coolant passages ($[\Sigma_{i=1}^{i=x} ni+1]$ of the HERS as a liquid only. During its flow across the passages of the HERS, the liquid coolant is thus preferably converted into a corresponding gas/liquid mixture which is then reconverted into a liquid in the coolant piping system which conveniently includes a coolant liquefaction system.

EXAMPLES

The invention will now be illustrated by referring to the figures.

Figure 3:
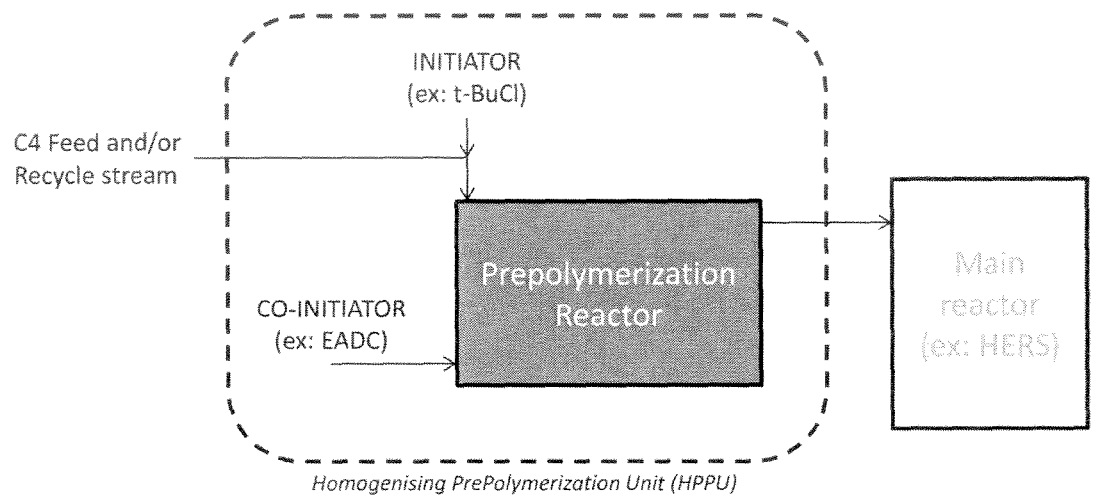

FIG. 3 is an illustrative embodiment of a polymerisation cascade process according to the present invention, FIGS. 1 and 2 are illustrative embodiments of the second polymerisation unit schemes according to the present invention.

Figure 1A:
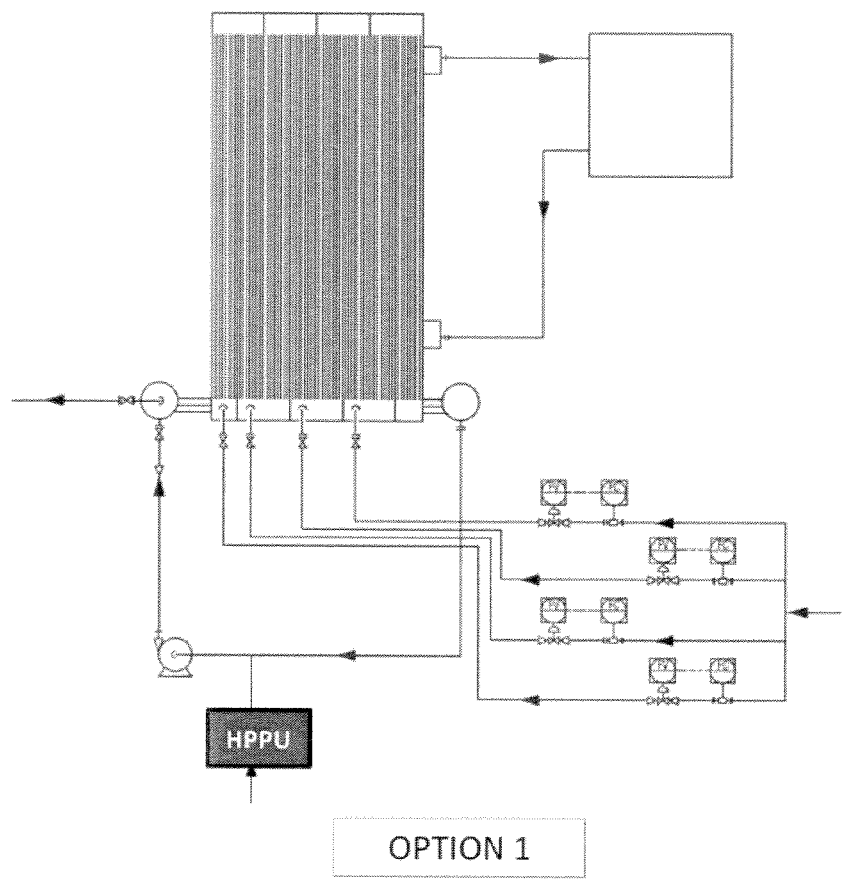
Figure 1B:
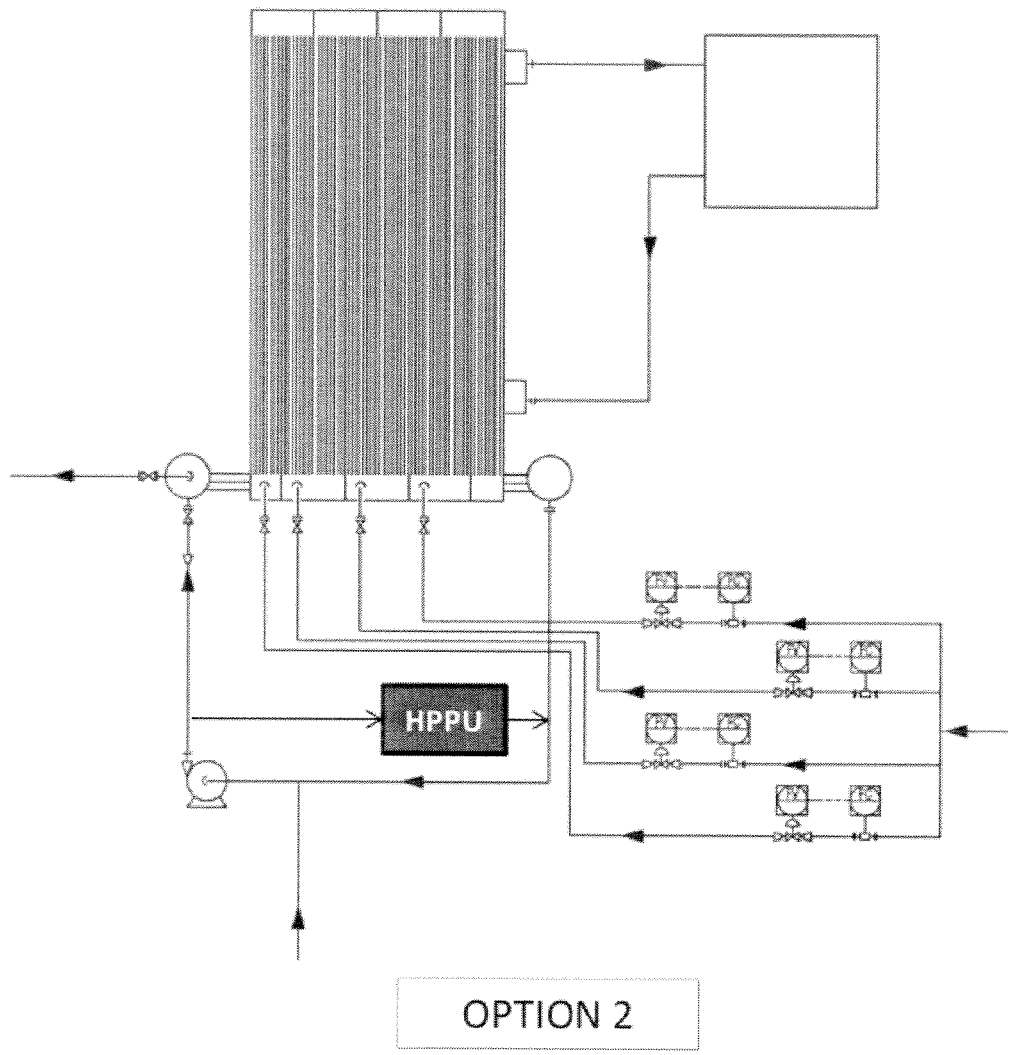
Figure 1C:
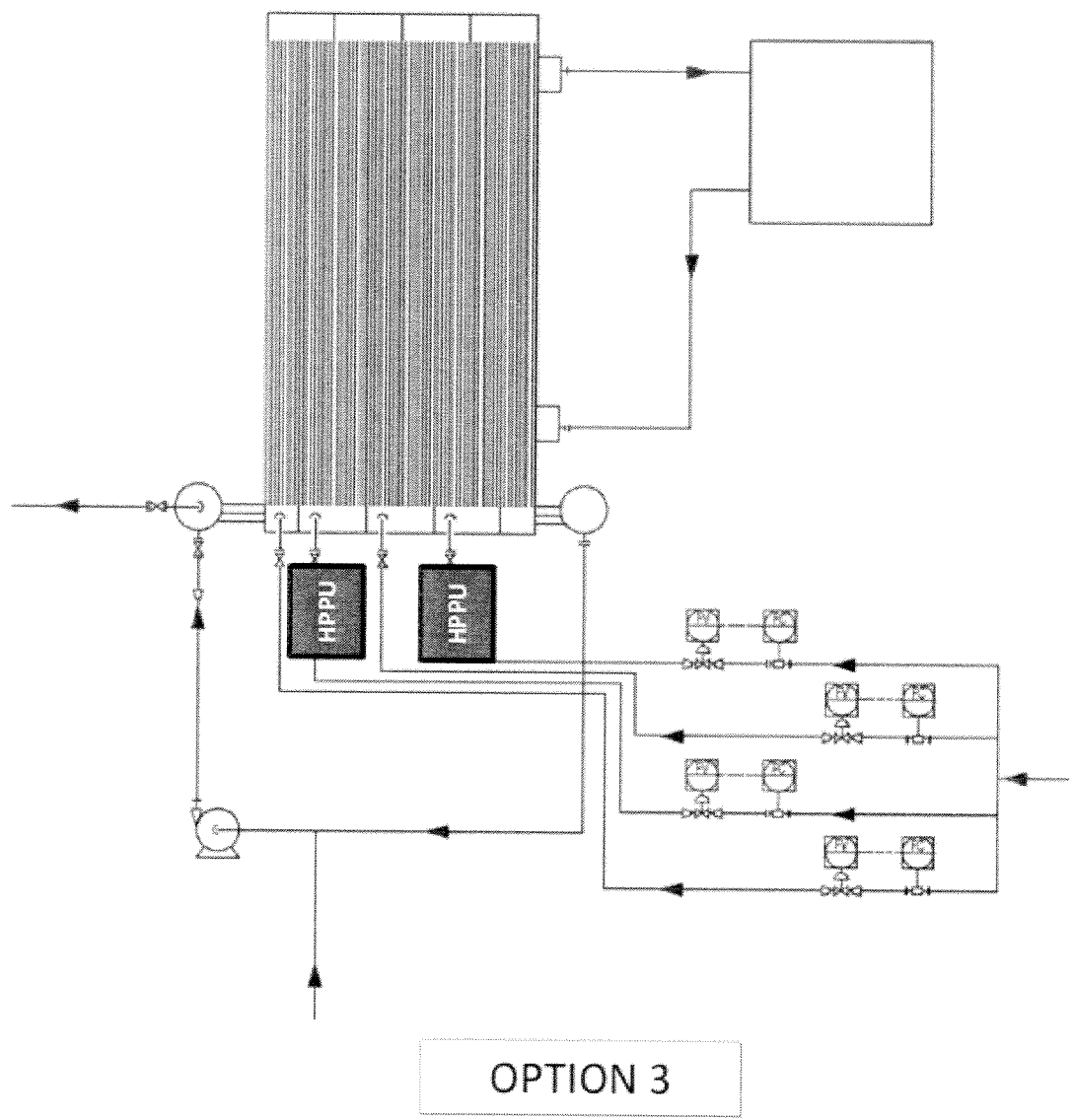

FIGS. 1a, 1b and 1c are illustrative embodiments of polymerisation unit schemes according to the present invention.

FIG. 1 is an illustrative embodiment of a second polymerisation unit according to the present invention.

FIG. 2 is an illustrative embodiment of a heat exchanger reactor system ("HERS") according to the present invention.

The illustrative embodiment according to FIG. 1 describes a simplified version of a second polymerisation unit according to the present invention.

Said polymerisation unit comprises a polymerisation loop and a coolant loop and a heat exchanger reactor system ("HERS") which is shared amongst the polymerisation loop and the coolant loop.

The HERS as depicted comprises
   eight sections, each section comprising n parallelepipedic channels for the reaction mixture and (n+1) passages for the coolant, wherein the last coolant channel of each section being preferably shared with the first coolant channel of its next section,
   one reaction mixture inlet on the bottom left side of the HERS,
   one reaction mixture outlet on the bottom right side of the HERS.

The polymerisation loop comprises a reaction mixture piping system connected to a reaction mixture inlet and a reaction mixture outlet of said HERS; a circulating pump can be seen on the bottom left side of the said reaction mixture piping system; the arrows depicted on the reaction mixture piping system indicate the direction of the recirculated reaction mixture flow path from reaction mixture outlet to reaction mixture inlet.

The polymerisation loop also comprises a polymer withdrawal system which can be seen on the bottom left outside of the HERS—upstream of the reaction mixture inlet; i.e. in this configuration, the polymer withdrawal is located on the reaction mixture piping system itself between the circulating pump and the reaction mixture inlet. In this configuration, the withdrawal can advantageously be done from the distribution box which is represented in the figure by a circle. Symmetrically from the HERS, the other circle, which is located downstream of the reaction mixture outlet, corresponds to the reaction mixture collecting box.

In the FIG. 1 polymerisation unit configuration, the flow path of the reaction mixture (which is not shown but can easily be understood in the simplified HERs representation according to FIG. 2) is a "serpentine flow path".

The reaction mixture inlet feed can advantageously comprise the monomer(s) and oligomer(s)/polymer(s), for example the isobutylene and the polyisobutylene, the catalyst system, for example t-butyl chloride and EADC, the monomer(s) diluent(s) and the catalyst component(s) solvent(s); said reaction mixture inlet feed being preferably the combination of the prepolymerised feed(s) coming from the HPPU together with the recirculating feed minus the withdrawn feed, and together with the optional fresh feeds.

The four FC/FV symbols located on the optional fresh feed lines correspond to flow control valves.

The HERS as depicted further comprises
one coolant inlet on the bottom right side of the HERS; it can be seen above the reaction mixture outlet for better understanding of the figure,
one coolant outlet on the top right side of the HERS,
said coolant inlet and outlet of the HERS connecting the HERS to the coolant piping system of the coolant loop. The coolant piping system comprises a refrigeration system; as explained in detail in the description, it is preferably a coolant liquefaction system which allows to reconvert the gas/liquid coolant mixture into the desired liquid evaporative coolant which is subsequently reintroduced into the HERS.

The illustrative embodiment according to FIG. 2 describes a simplified version of a HERS according to the present invention.

Said HERS comprises
one reaction mixture inlet on the bottom left side of the HERS; in this embodiment, the reaction mixture inlet feed can advantageously comprise the monomer(s) and polymer(s), for example the isobutylene and the polyisobutylene, the catalyst system, for example t-butyl chloride and EADC; said reaction mixture inlet feed being preferably the combination of the prepolymerised feed(s) coming from the HPPU together with the recirculating feed minus the withdrawn feed (not shown on this figure);
one reaction mixture outlet on the bottom right side of the HERS;
two sections, i.e. one left section comprising the reaction mixture inlet and one right section comprising the reaction mixture outlet; each section comprising three reaction mixture channels surrounded by four coolant channels, i.e. a total of six reaction mixture channels and seven coolant channels, one coolant channel being shared amongst the two sections.

In the FIG. 2 HERS configuration, the flow path of the reaction mixture (as shown by the arrows) is a "serpentine flow path", i.e. the flow path of the reaction mixture in the first section is ascending and the flow path of the reaction mixture in the last (second) section is descending. This serpentine flow path can equally apply to embodiments wherein more than two sections are used; for example, the same applies to FIG. 1 which depicts an eight sections serpentine flow path configuration.

In the FIG. 2 HERS configuration, the flow path of the coolant (e.g. liquid propylene) is ascending (as shown by the arrows); the coolant inlet pipe which feeds the seven coolant channels at their bottom end can be seen on the right end side of the figure; the coolant exit pipe which collects the seven coolant channels at their upper end can be seen on the right end side of the figure.

The simplified HERS configuration of FIG. 2 also comprises:
one reaction mixture inlet box which is located in the HERS at the bottom of the first section;
one reaction mixture exit box which is located in the HERS at the bottom of the last (second) section;
one reaction mixture junction zone which connects the three parallelepipedic channels for the reaction mixture feed of the first section to the three parallelepipedic channels for the reaction mixture feed of the second section.

FIG. 3 is an illustrative embodiment of a polymerisation cascade process according to the present invention. In this illustrative embodiment, the C4 feed and/or the C4 recycle stream (e.g. the isobutylene comprising feed) is pre-mixed with the initiator (e.g. t-butyl chloride); said mixture and the co-initiator (e.g. EADC) are separately introduced in the prepolymerisation reactor wherein prepolymerisation proceeds according to the process of the present invention. The resulting prepolymer is then introduced in the polymerisation loop reactor (e.g. the HERS) wherein polymerisation proceeds according to the process of the present invention.

FIGS. 1a, 1b and 1c are illustrative embodiments of polymerisation unit schemes according to the present invention. Said figures illustrate different points of introductions for the prepolymerised feeds into the polymerisation loop unit.

In FIG. 1a polymerisation unit configuration, the prepolymerised feed is introduced in the circulating feed between the reaction mixture outlet and the pump.

In FIG. 1b polymerisation unit configuration, the prepolymerised feed is also introduced in the circulating feed between the reaction mixture outlet and the pump; additionally, in this configuration, the feed introduced into the prepolymerisation unit (the HPPU) also comprises part of the recycle stream.

In FIG. 1c polymerisation unit configuration, the prepolymerised feeds are introduced at several points of introduction in the HERS as depicted in the two points of introductions at the bottom of the HERS, respectively in two of the three bottom reaction mixture junction zones (which connect the bottom channels for the reaction mixture feed of a section to the bottom channels for the reaction mixture feed of the next section). The present invention also covers alternative embodiments wherein the introduction of the prepolymerised feeds is organised in one or more or all of the introduction points of the polymerisation loop; even if all said points have not been represented in the illustrative figures.

The invention claimed is:

1. Ionic polymerisation cascade process for the polymerisation of a liquid monomer(s) containing reaction mixture in a polymerisation system comprising a first homogenising prepolymerisation unit ("HPPU") and a second polymerisation unit in series wherein the polymerisation reaction starts in the HPPU and continues in the second polymerisation unit consisting of a polymerisation loop, a coolant loop and a heat exchanger reactor system ("HERS") which is shared amongst the polymerisation loop and the coolant loop, characterised in that
   the HERS has a ratio of surface area to reaction mixture volume ("S/V" expressed in $m^2/m^3$) higher than 10 and lower than 450, and
   the HPPU has a ratio of surface area to reaction mixture volume ("S/V" expressed in $m^2/m^3$) higher than 600, and
   the ratio between the residence time of the reaction mixture in the first homogenising prepolymerisation unit and the residence time of the reaction mixture in the second polymerisation unit is comprised between 0.01% and 5%.

2. Ionic polymerisation cascade process according to claim 1 wherein the residence time of the reaction mixture in the HPPU reactor (which is calculated by dividing the volume of the HPPU reactor by the volumetric feed rate) is in the range from 0.5 sec to 200 seconds.

3. Ionic polymerisation cascade process according to claim 1 wherein the residence time of the reaction mixture in the polymerisation loop (which is calculated by dividing the volume of the polymerisation loop reactor by the volumetric feed rate) is in the range from 10 sec to 100 min.

4. Ionic polymerisation cascade process according to claim 1 wherein the homogenising prepolymerisation unit ("HPPU") reactor is a fluidic device with fluid channels the smallest dimension of which is in the range of from 1.0 millimeter to 3.0 millimeters.

5. Ionic polymerisation cascade process according to claim 1 wherein the homogenising prepolymerisation unit ("HPPU") reactor is a fluidic device with fluid channels wherein the characteristic dimension of such fluidic device is defined as the smallest dimension perpendicular to the reaction mixture flow direction, and said characteristic dimension is comprised between 50 microns and 8.0 millimeters.

6. Ionic polymerisation cascade process according to claim 1 wherein
   the homogenising prepolymerisation unit ("HPPU") reactor is a fluidic device which includes at least one reaction mixture passage and one or more thermal control passages, the one or more thermal control passages being positioned and arranged within two volumes each bordered by a wall, the walls being planar and parallel to one another, the reaction mixture passage positioned between said planar walls and defined by said planar walls and walls extending between said planar walls being in the micrometer to millimeter range.

7. Ionic polymerisation cascade process according to claim 1 wherein the homogenising prepolymerisation unit ("HPPU") reactor is characterised by a mixing performance characterised by a UV transmission value which is greater than 80% according to the Villermaux test (measured by the method described in Villermaux J., et al. "Use of Parallel Competing Reactions to Characterize Micro Mixing Efficiency," AIChE Symp. Ser. 88 (1991) 6, p. 286).

8. Ionic polymerisation cascade process according to claim 1 wherein the HPPU reactor is characterised by a volumetric heat transfer coefficient (expressed in $MW/m^3.K$)
   higher than 0.5, and
   lower than 3.0.

9. Ionic polymerisation cascade process according to claim 1 wherein the second stage process is an ionic polymerisation loop process in the second polymerisation unit which comprises a polymerisation loop, a coolant loop and a heat exchanger reactor system ("HERS") which is shared amongst the polymerisation loop and the coolant loop wherein the polymerisation loop comprises a polymer withdrawal system and a reaction mixture piping system which comprises a circulating pump and which is connected to an inlet and an outlet of said HERS and wherein the coolant loop comprises a coolant piping system connected to an inlet and an outlet of said HERS, characterised in that
   1. the HERS comprises at least one section in which both the reaction mixture and the coolant are circulated,
   2. the said HERS' section(s) comprises "n" (n being an integer superior or equal to 1) Parallelepipedic channel(s) wherein the reaction mixture is circulated and "n+1" passages wherein the coolant is circulated,
   3. the flow paths of the reaction mixture in the "n" channel(s) of a section are unidirectionally parallel,
   4. the flow paths of the coolant in the "n+1" passages of a section are unidirectionally parallel to the reaction mixture flow paths, and
   5. the coolant is not in direct contact with the reaction mixture.

10. Ionic polymerisation cascade process according to claim 9 wherein the temperature difference of the coolant between any point within the coolant side of the HERS is lower than 3° C.

11. Ionic polymerisation cascade process according to claim 1 wherein the second stage process is an ionic polymerisation loop process in the second polymerisation unit which comprises a polymerisation loop, a coolant loop and a heat exchanger reactor system ("HERS") which is shared amongst the polymerisation loop and the coolant loop wherein the polymerisation loop comprises a polymer withdrawal system and a reaction mixture piping system which comprises a circulating pump and which is connected to an inlet and an outlet of said HERS and wherein the coolant loop comprises a coolant piping system connected to an inlet and an outlet of said HERS, characterised in that
   1. the HERS comprises at least one section in which both the reaction mixture and the coolant are circulated,
   2. the said HERS' section(s) comprises "n" (n being an integer superior or equal to 1) Parallelepipedic channel(s) wherein the reaction mixture is circulated and "n+1" passages wherein the coolant is circulated and at least partially evaporated,
   3. the flow paths of the reaction mixture in the "n" channel(s) of a section are unidirectionally parallel,
   4. the coolant is an evaporative coolant,
   5. the flow paths of the evaporative coolant in the "n+1" passages of a section are unidirectionally parallel to the reaction mixture flow paths,
   6. the coolant is not in direct contact with the reaction mixture, and
   7. the coolant piping system comprises a coolant liquefaction system.

12. Process according to claim 9 wherein the HERS is a platular reactor which comprises at least "x" sections, x being an integer superior or equal to 2, the said sections being parallel and in series and side by side, wherein the flow path of the reaction mixture in a section of the HERS is opposite to the flow path of the reaction mixture in the next section ("serpentine flow path"), wherein the flow path of the reaction mixture in the channel(s) of the first section is ascending and the flow path of the reaction mixture in the channel(s) of the last section is descending, wherein the direction of the flow paths of the reaction mixture in the channel(s) of the sections of the HERS are vertical, and the direction of the flow paths of the coolant in the passages of the sections of the HERS are vertical and ascending, and wherein a section shares its last coolant passage with the first coolant passage of the next section.

13. Process according to claim 12 wherein the number of sections "x" is pair and is superior to or equal to 4.

14. Process according to claim 12 wherein each HERS' section comprises "n" (n being an integer comprised between 4 and 16) Parallelepipedic channels for the reaction mixture and "n+1" parallelepipedic channels passages for the coolant.

15. Process according to claim 14 wherein
the dimensions of the reaction mixture parallelepipedic channels are characterised by
a first dimension ("height") comprised between 2 and 10 m, and/or
a second dimension ("depth") comprised between 0.1 and 3 m, and/or
a third dimension ("width") comprised between 2 and 50 mm,
and wherein the dimensions of the coolant parallelepipedic channels are characterised by
a first dimension ("height") comprised between 2 and 10 m, and/or
a second dimension ("depth") comprised between 0.1 and 3 m, and/or
a third dimension ("width") comprised between 1 and 30 mm.

16. Process according to claim 1 wherein the liquid monomer(s) containing reaction mixture comprises a catalyst system consisting in a Lewis acid co-initiator system, i.e. a Lewis acid acting as a co-initiator.

17. Process according to claim 16 wherein an initiator is present and is premixed with the liquid monomer before its introduction into the HPPU.

18. Process according to claim 1 wherein the HPPU is characterised by a ratio of surface area to reaction mixture volume ("S/V" expressed in $m^2/m^3$) comprised between 1000 and 3500.

19. Process according to claim 1 wherein a piping (Vext) connects the outlet of the HPPU to the second polymerisation unit, the reaction mixture flows through passages of the HPPU, and the ratio between the internal volume of the piping (Vext) and the internal volume (Vhppu) of the reaction mixture passages of the HPPU is lower than three.

20. Process according to claim 1 wherein a piping (Vext) connects the outlet of the HPPU to the second polymerisation unit and the piping is thermally isolated and/or thermally controlled.

21. Process according to claim 1 wherein the difference between the reactant temperature at the outlet of the HPPU (Thppu) and the temperature of the said reactant at its point of introduction in the second polymerisation unit (Tin) is lower than 10° C. ([Thppu-Tin]<10° C.).

22. Process according to claim 11 wherein the HERS is a platular reactor which comprises at least "x" sections, x being an integer superior or equal to 2, the said sections being parallel and in series and side by side, wherein the flow path of the reaction mixture in a section of the HERS is opposite to the flow path of the reaction mixture in the next section ("serpentine flow path"), wherein the flow path of the reaction mixture in the channel(s) of the first section is ascending and the flow path of the reaction mixture in the channel(s) of the last section is descending, wherein the direction of the flow paths of the reaction mixture in the channel(s) of the sections of the HERS are vertical, and the direction of the flow paths of the coolant in the passages of the sections of the HERS are vertical and ascending, and wherein a section shares its last coolant passage with the first coolant passage of the next section.

23. Ionic polymerisation cascade process according to claim 1 for the polymerisation of a isobutylene containing reaction mixture wherein
the HPPU has a ratio of surface area to reaction mixture volume comprised between 1000 and 5000,
the ratio between the residence time of the reaction mixture in the first homogenising prepolymerisation unit and the residence time of the reaction mixture in the second polymerisation unit is comprised between 0.1% and 2%,
the residence time of the reaction mixture in the HPPU reactor is in the range from 2 seconds to 50 seconds, and
the residence time of the reaction mixture in the polymerisation loop is in the range from 2 min to 90 min.

* * * * *